(12) United States Patent
Chang

(10) Patent No.: US 8,555,300 B1
(45) Date of Patent: Oct. 8, 2013

(54) OPTICAL DISC DRIVER

(75) Inventor: Chin-Jung Chang, New Taipei (TW)

(73) Assignee: Getac Technology Corporation, Hsinchu (TW)

( * ) Notice: Subject to any disclaimer, the term of this patent is extended or adjusted under 35 U.S.C. 154(b) by 0 days.

(21) Appl. No.: 13/595,823

(22) Filed: Aug. 27, 2012

(30) Foreign Application Priority Data

Apr. 24, 2012 (CN) .......................... 2012 1 0122056

(51) Int. Cl.
*G11B 17/04* (2006.01)
(52) U.S. Cl.
USPC .......................................... 720/603
(58) Field of Classification Search
USPC .......................................... 720/603
See application file for complete search history.

(56) References Cited

U.S. PATENT DOCUMENTS

| 5,563,400 | A * | 10/1996 | Le Roux | 235/486 |
| 5,799,009 | A * | 8/1998 | Takahashi et al. | 720/730 |
| 6,845,509 | B2 * | 1/2005 | Hsieh et al. | 720/601 |
| 7,028,321 | B2 * | 4/2006 | Ishida et al. | 720/720 |
| 8,141,108 | B2 * | 3/2012 | Yokota et al. | 720/613 |
| 2004/0163098 | A1 * | 8/2004 | Ishida et al. | 720/720 |

* cited by examiner

*Primary Examiner* — Mark Blouin

(57) ABSTRACT

The disclosure provides an optical disc driver for loading or loading/writing an optical disc and accessing at least one memory card. The optical disc driver includes a housing and a rectangular body. The rectangular body formed mainly for loading an optical disk includes a front panel disposed at a front side of the rectangular body; a main space for loading or loading/writing the optical disk, and an optical loading device is disposed in the main space; and a spare space for accessing the at least one memory card, and a plurality of electrical pins disposed in the spare space. The rectangular body moves in relative to the housing along a left-right direction of the front panel, the main space and the spare space are formed downward from a same plane, and the spare space is a small section extending from one of two sides of the front panel.

10 Claims, 9 Drawing Sheets

OPTICAL DISC DRIVER

BACKGROUND

1. Technical Field

The disclosure relates to an optical disc driver, and in particular, to an optical disc driver for loading/writing an optical disk and accessing a memory card simultaneously.

2. Related Art

In recent years, consumers have strong demand for thinner and lighter portable electronic device, so each manufacturer is devoted to reduce the weight and volume of the portable electronic device. Therefore, how to achieve the balance between reducing the weight and volume of the portable electronic device and maintaining or upgrading the performance and functions of the portable electronic device is the problem that the manufacturers are dedicated to solve.

For example, a conventional portable electronic device, such as a laptop computer, includes an optical disc driver and a memory card driver. The optical disc driver and the memory card driver are disposed at the same side of a shell of the laptop computer. The optical disc driver is used for loading an optical disc, and the memory card driver is used for accessing a memory card. Obviously, when the optical disc driver and the memory card driver are both disposed in the laptop computer separately, the weight and volume of the laptop computer is increased so that the conventional laptop computer may not meet the strong consumer demand for thin and lightweight.

SUMMARY

An embodiment discloses an optical disc driver for loading or loading/writing an optical disc and accessing at least one memory card. The optical disc driver comprises a housing and a rectangular body. The rectangular body is formed mainly for loading or loading/writing an optical disk. The rectangular comprises a front panel, a main space and a spare space. The front panel is disposed at a front side of the rectangular body. The main space is used for loading the optical disk, and an optical loading device is disposed in the main space. The spare space is used for accessing the at least one memory card, and a plurality of electrical pins are disposed in the spare space. The rectangular body moves in relative to the housing along a left-right direction of the front panel. The main space and the spare space are formed downward from a same plane, and the spare space is a small section extending from one of two sides of the front panel.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

The detailed features and advantages of the disclosure are described below in great detail through the following embodiments, the content of the detailed description is sufficient for those skilled in the art to understand the technical content of the present disclosure and to implement the disclosure there accordingly. Based upon the content of the specification, the claims, and the drawings, those skilled in the art can easily understand the relevant objectives and advantages of the disclosure.

An embodiment discloses an optical disc driver disposed in a portable electronic device. In this embodiment, the portable electronic device is a laptop computer. The optical disc driver may load or load/write an optical disk and access a memory card simultaneously.

Figure 1:
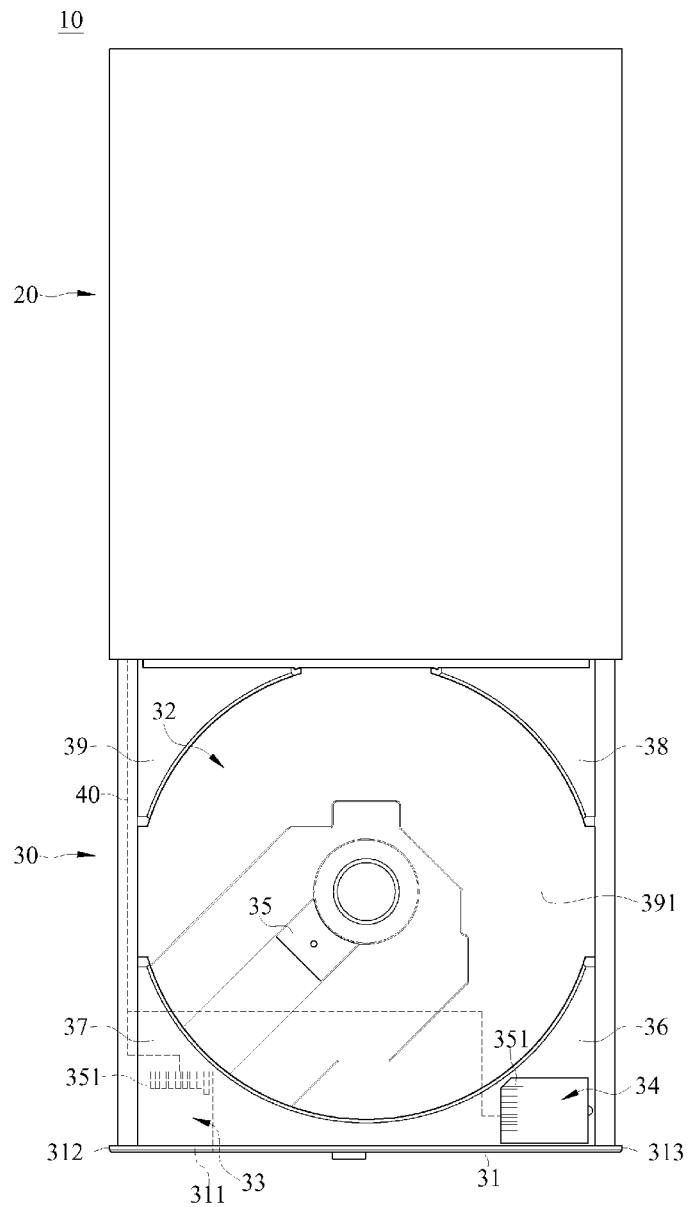
FIG. 1 is a top view of an optical disc driver according to first embodiment.

Please refer to FIG. 1, which is a top view of an optical disc driver according to first embodiment. In this embodiment, the optical disc driver 10 has a housing 20 and a rectangular body 30. The housing 20 is used for containing the rectangular body 30. The rectangular body 30 is mainly used for loading or loading/writing the optical disk (not shown). The rectangular body 30 may move in relative to the housing 20. The rectangular body 30 comprises a front panel 31, a main space 32, spare spaces 33, 34 and arc parts 36, 37, 38, 39. The front panel 31 is disposed at a front side of the rectangular body 30. The front panel 31 has a side edge 312 and a side edge 313. The side edge 312 and the side edge 313 are disposed at two opposite sides of the front panel 31, respectively. In this embodiment, the front panel 31 has an opening 311. The opening 311 is disposed at the side edge 312 of the front panel 31.

The main space 32 and the spare spaces 33, 34 are formed downward from a plane (not shown) of the rectangular body 30. The main space 32 is formed downward to an upper surface 391. That is to say, the main space 32 is a concave area in the middle of the rectangular body 30. The main space 32 is an optical disk slot and is used for loading or loading/writing the optical disk. An optical loading device 35 is disposed in the main space 32 for loading or loading/writing the optical disk.

The arc parts 36, 37, 38, 39 are disposed at four corners of the rectangular body 30, respectively. And the arc parts 36, 37, 38, 39 are protruded from the upper surface 391. That is, the arc parts 36, 37, 38, 39 surround the main space 32. In addition, the arc part 36 is connected to the side edge 313 of the front panel 31. The arc part 37 is connected to the side edge 312 of the front panel 31. The arc parts 38, 39 are both disposed at a back side of the rectangular body 30.

Moreover, the spare space 33 is formed downward from the arc part 37. The spare space 33 is a small section extending inward from the side edge 312 of the front panel 31. The above-mentioned section is in the arc part 37. In this embodiment, the spare space 33 is exposed to outside through the opening 311 of the front panel 31. The shape of the opening 311 corresponds to that of the spare space 33. The spare space 33 is used for containing the memory card (not shown). Further, the spare space 33 is a memory card slot and is used for accessing the at least one memory card.

In addition, the spare space 34 is formed downward from the arc part 36. The spare space 34 is a small section extending inward from the side edge 313 of the front panel 31. The above-mentioned section is in the arc part 36. The spare space 34 is exposed to outside from the arc part 36 and is used for containing the memory card. The spare space 34 is a memory card slot.

Moreover, multiple electrical pins 351 are disposed in the spare spaces 33, 34, respectively. The electrical pins 351 are used for electrically connecting to the corresponding memory cards. The rectangular body 30 further comprises a circuit 40. The circuit 40 is used that the electrical pins 351 or the optical loading device 35 is/are electrically connected to the housing 20 via the circuit 40.

It should be noted that, the spare spaces 33, 34 are residual spaces where the main space 32 and the space of the circuit 40 are subtracted from the space of the rectangular body 30. From the above description, it can be understood that the main space 32 and the spare spaces 33, 34 are not overlapped to each other.

Figure 2:
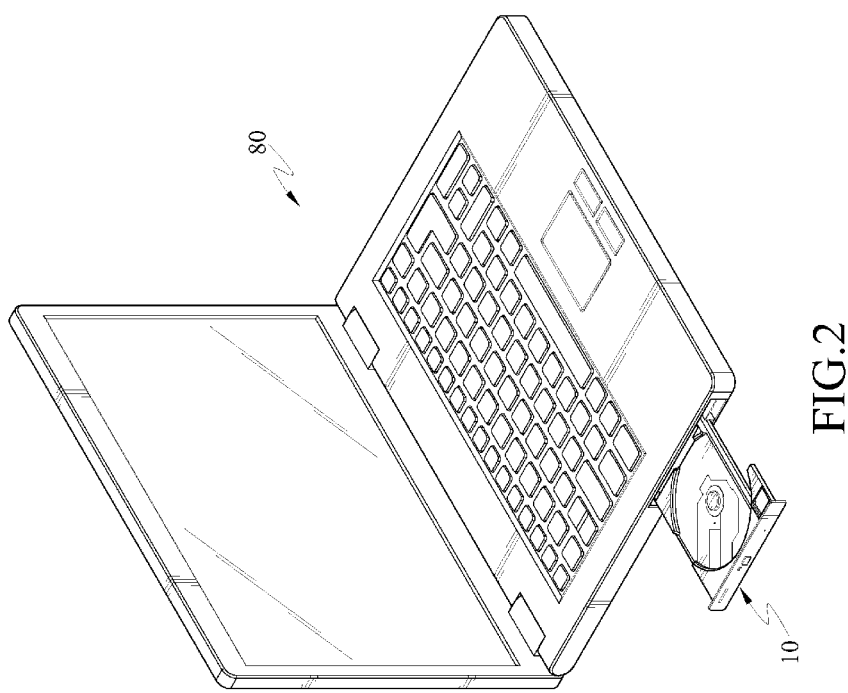
FIG. 2 is a schematic view (1) of an optical disc driver according to first embodiment.
Figure 3:
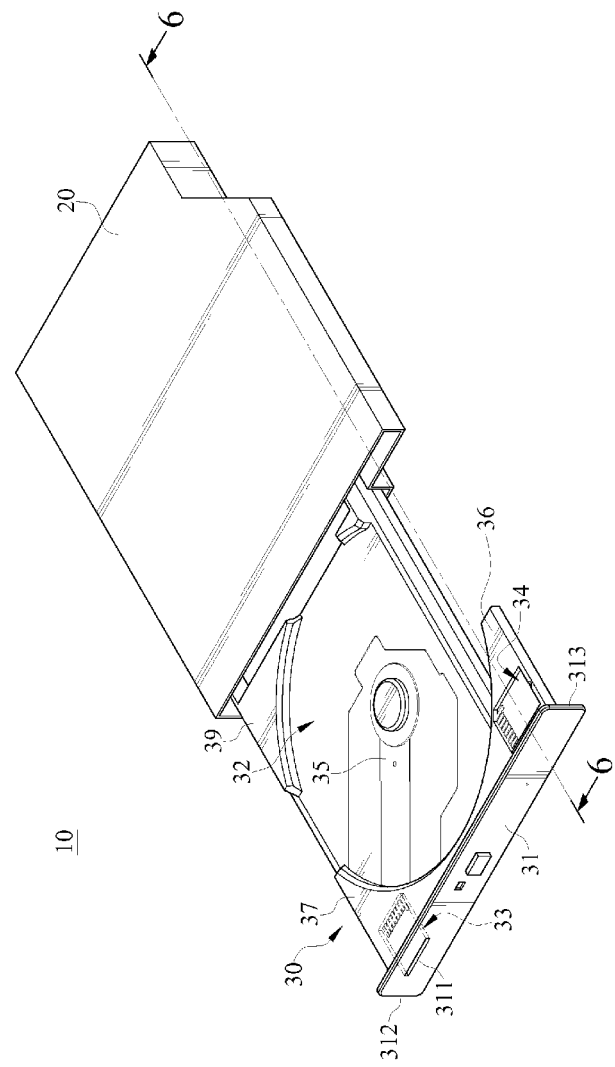
FIG. 3 is a schematic view (2) of an optical disc driver according to first embodiment.
Figure 4:
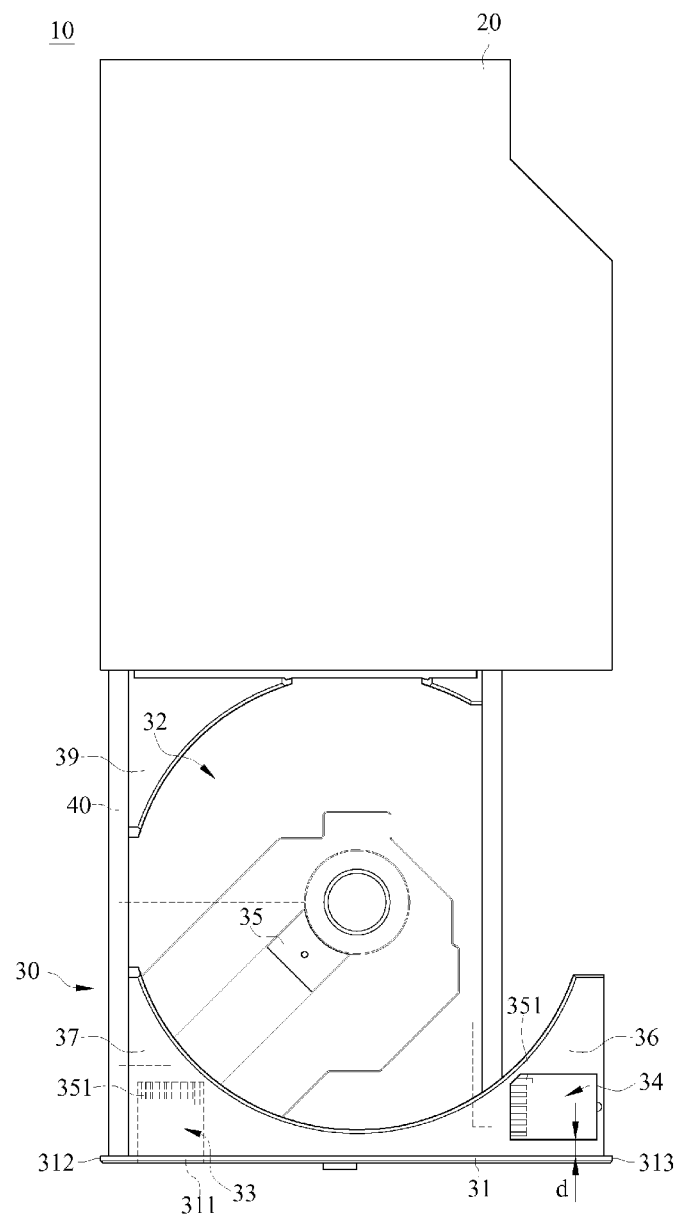
FIG. 4 is a top view of an optical disc driver according to second embodiment.
Figure 6:
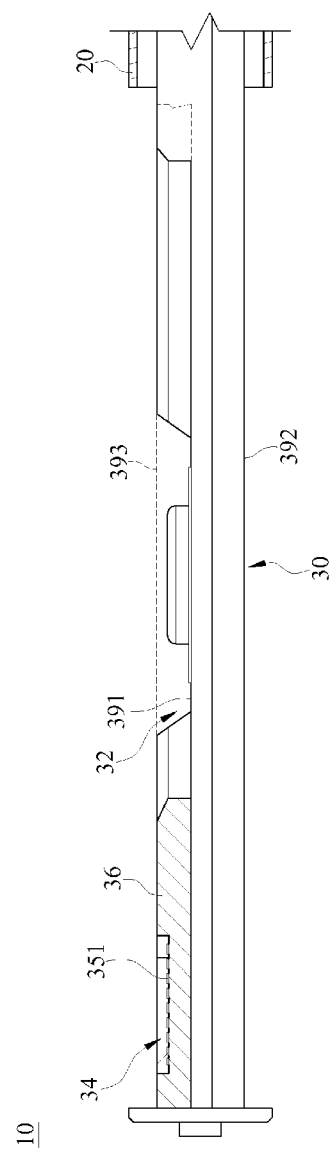
FIG. 6 is a cross-sectional side view of the optical disc driver along 6-6 line shown in FIG. 3.

Please refer to FIGS. 2, 3, 4, and 6. FIG. 2 is a schematic view (1) of an optical disc driver according to first embodiment. FIG. 3 is a schematic view (2) of an optical disc driver according to first embodiment. FIG. 4 is a top view of an optical disc driver according to second embodiment. FIG. 6 is a cross-sectional side view of the optical disc driver along 6-6 line shown in FIG. 3.

The difference between this embodiment and the first embodiment is that the shape of a housing 20 and that of a rectangular body 30 in this embodiment are not completely rectangular. Therefore, the inner space of a laptop computer occupied by an optical disc driver 10 is reduced. In this embodiment, the laptop computer 80 comprises the optical disc driver 10. The optical disc driver 10 comprises the housing 20 and the rectangular body 30. The rectangular body 30 comprises a front panel 31, a main space 32, a plurality of spare spaces 33, 34 and a plurality of arc parts 36, 37, 39.

Please refer to FIG. 6, the rectangular body 30 has an upper surface 391 and a lower surface 392. The upper surface 391 and the lower surface 392 both correspond to a plane 393. The main space 32 and the spare spaces 33, 34 are formed downward from the same plane 393 together. The spare space 32 is a concave area in the middle of the rectangular body 30. The spare space 32 is used for loading or loading/writing an optical disc. The main space 32 is an optical disk slot. The shape of the optical disk slot corresponds to that of the optical disk. An optical loading device 35 is disposed in the main space 32 for loading or loading/writing the optical disk.

Please back to FIGS. 3, 4 and 6. In this embodiment, the shape of the rectangular body 30 is nearly a rectangular shape. That is, a portion of the rectangular body 30 is in irregular shape. Therefore, compared to the first embodiment, the rectangular body 30 only has the arc parts 36, 37, 39. The arc parts 36, 37, 39 are disposed around the main space 32, respectively. The arc parts 36, 37, 39 are protruded from the upper surface 391. The spare space 33 is in the arc parts 37 and the spare space 34 is in the arc parts 36. The spare spaces 33, 34 are used for accessing at least one memory card (not shown).

In some embodiments, the spare spaces 33, 34 are memory card slots. The shapes of the memory card slots correspond to those of the memory cards, respectively.

The spare space 33 is a small section extending inward from a side edge 312 of the front panel 31. In this embodiment, the spare space 33 is directly connected to the front panel 31.

The spare space 34 is a small section extending inward from a side edge 313 of the front panel 31. The spare space 34 keeps a distance d from the front panel 31. The spare space 34 is exposed outside from the arc part 36.

In some embodiments, the front panel has an opening 311 penetrating the memory card slot. The shape of the opening 311 corresponds to that of the memory card. In this embodiment, the opening 311 is disposed at the side edge 312 of the front panel 31.

It should be noted that, the rectangular body 30 further comprises a circuit 40. The circuit 40 is connected to the optical loading device 35 or a plurality of electrical pins 351 of the spare spaces 33, 34. The spare spaces 33, 34 are the residual spaces where the main space 32 and the space of the circuit 40 are subtracted from the space of the rectangular body 30. From the above description, it can be understood that the main space 32 and the spare spaces 33, 34 are not overlapped to each other.

In some embodiments, the two electrical pins 351 are disposed in the spare spaces 33, 34, respectively. The electrical pins 351 are used for electrically connecting to the memory cards so that the electrical pins 351 may access (load) the memory card.

The position and the amount of the spare spaces 33, 34 are not limited to the embodiment. In other embodiments, the total amount of the memory cards that the spare space contains may be 1, 3, 4, 5 and 6.

Figure 5:
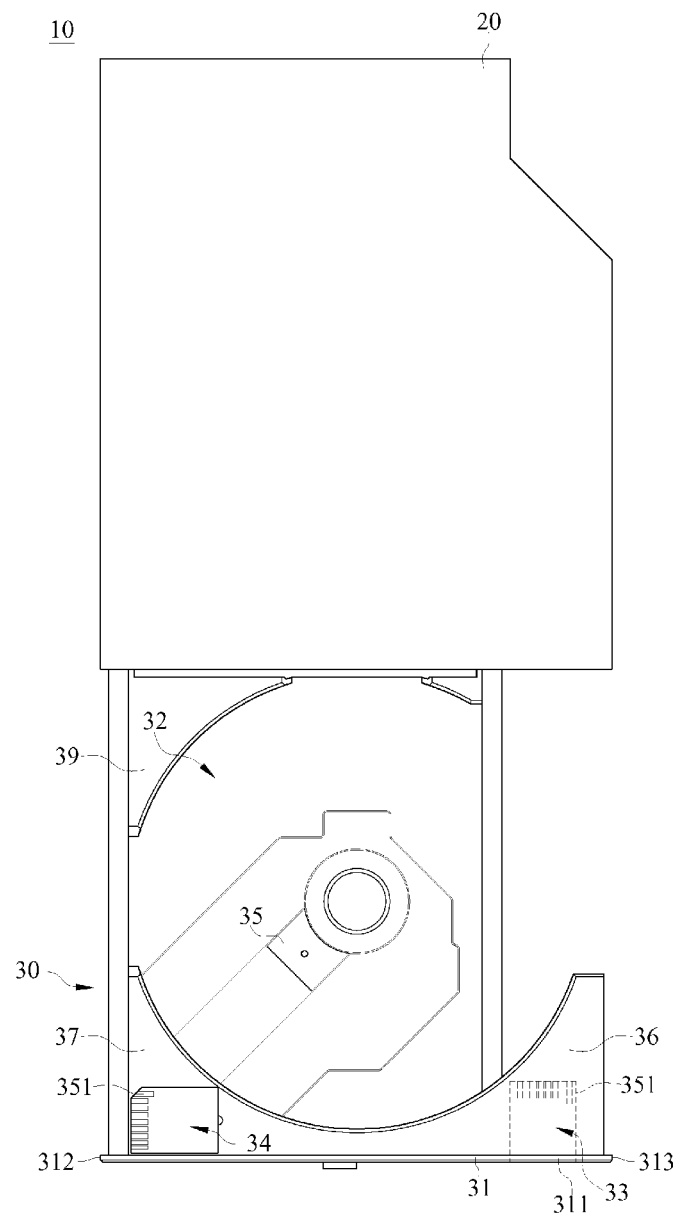
FIG. 5 is a top view of an optical disc driver according to third embodiment.

Please refer to FIG. 5, which is a top view of an optical disc driver according to third embodiment. In this embodiment, an optical disc driver 10 has multiple spare spaces 33, 34. The spare space 33 is disposed at a side edge 313 and corresponds to an opening 311. A memory card is adapted to be inserted into or ejected from the spare space 33 via the opening 311. The spare space 34 is disposed at a side edge 312 and is exposed to outside from an arc part 37.

In this embodiment, an optical disc is a digital storage device. The optical disc may be a BLU-RAY DISC, a Digital Versatile Disc (DVD) or a Compact Disc (CD). The BLU-RAY DISC may be BD-R or BD-RE. The DVD may be DVD-R, DVD+R, DVD-R DL, DVD+R DL, DVD-R DS, DVD+R DS, DVD-RW, DVD+RW, DVD-RAM, DVD-D, DVD-A, HVD or Eco Disc. The CD may be Red Book, CD-ROM, CD-R, CD-RW, 5.1 Music Disc, SACD, Photo CD, CD Video (CDV), Video CD (VCD), SVCD, CD+G, CD-Text, CD-ROM XA, CD-i. But the above-mentioned optical discs are not limited to the embodiment.

In this embodiment, the memory card is a solid state electronic flash memory data storage device. The memory card may be microSD card, microSDHC card, Extreme Digital-Picture card, miniSD card, Memory Stick PRO Duo card or Memory Stick Micro (M2) card. But the above-mentioned memory cards are not limited to the embodiment.

Figure 7:
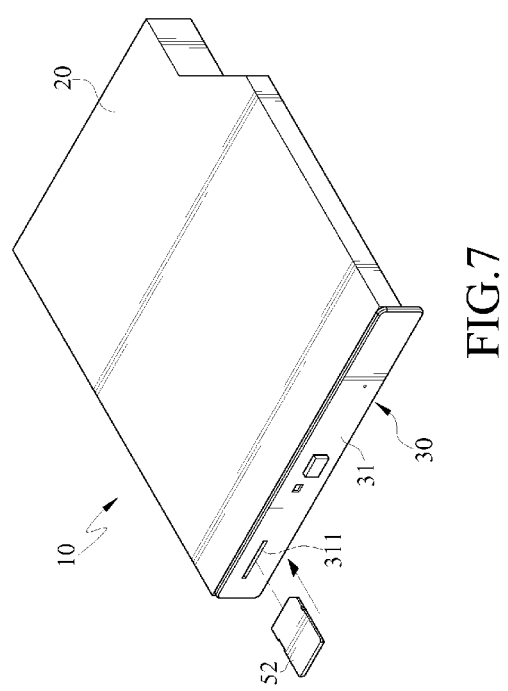
FIG. 7 is a schematic view of an optical disc driver at first position according to second embodiment.
Figure 8:
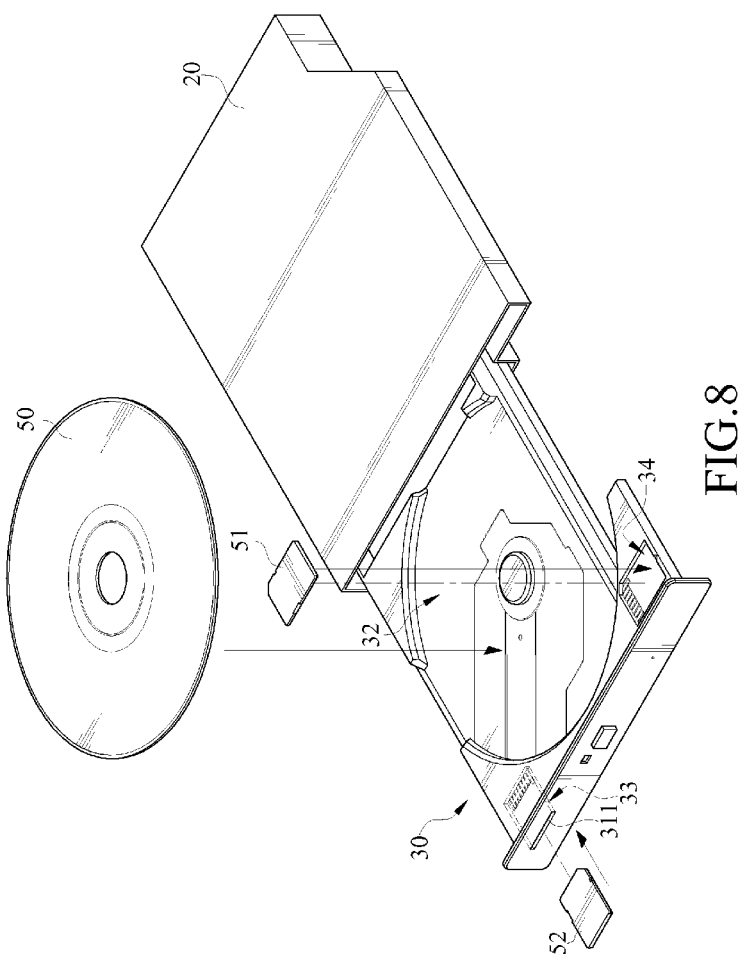
FIG. 8 is a schematic view (1) of an optical disc driver at second position according to second embodiment.
Figure 9:
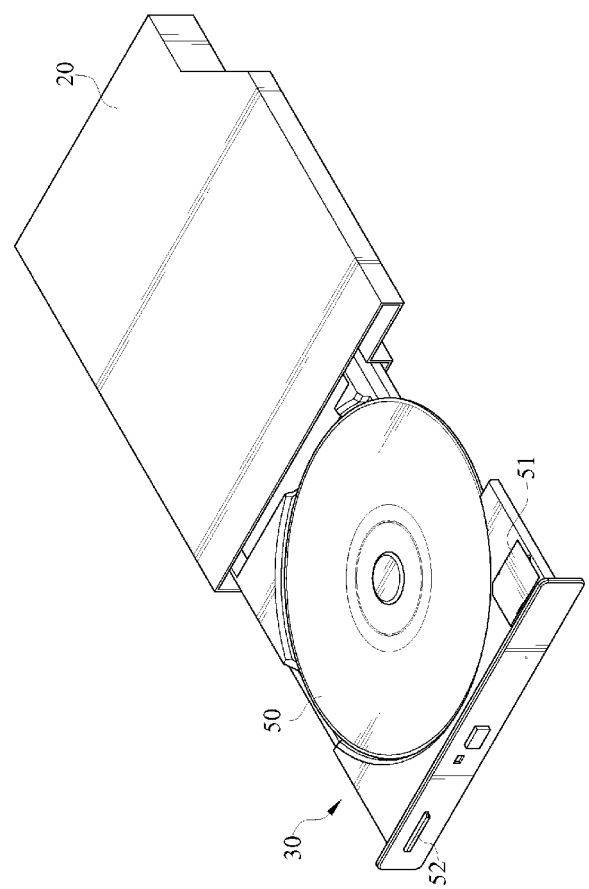
FIG. 9 is a schematic view (2) of an optical disc driver at second position according to second embodiment.

Please refer to FIGS. 7, 8 and 9. FIG. 7 is a schematic view of an optical disc driver at first position according to second embodiment. FIG. 8 is a schematic view (1) of an optical disc driver at second position according to second embodiment. FIG. 9 is a schematic view (2) of an optical disc driver at second position according to second embodiment. In the second embodiment, the rectangular body 30 has a first position (as shown in FIG. 7) and a second position (as shown in FIG. 8 and FIG. 9) which are in relative to the housing 30. The rectangular body 30 may be moved from the first position to the second position along a left-right direction (the left-right direction is the same as that in FIG. 6) of a front panel 31. When the rectangular body 30 is at the first position, the rectangular body 30 is in the housing 20 and a memory card 52 may be inserted into the rectangular body 30 along an opening 311. The second position is that when an optical disc 50 is ejected from an optical disc driver 10, the position that the rectangular body 30 is ejected from the optical disc driver 10. When the rectangular body 30 is at the second position, a major part of the rectangular body 30 is ejected form the housing 20. The optical disc 50 and the memory cards 51, 52 may be inserted into a main space 32, a plurality spare spaces 34, 33, respectively. Further, when the optical disc 50 and the memory cards 51, 52 are inserted into the main space 32 and the spare spaces 34, 33, the optical disc 50 and the memory cards 51, 52 are not interfered or overlapped to each other.

To sum up, the optical disc driver disclosed in the embodiments may be inserted the optical disc and the memory cards into itself for loading, loading/writing or accessing the optical disc and the memory cards simultaneously. Therefore, it is not necessary for the laptop computer that an optical disc driver and a memory card driver are both disposed in the laptop computer simultaneously, thereby, making the laptop computer small, thin and lightweight to meet the strong consumer demand. In addition, because the optical disc and the memory cards are not interfered or overlapped to each other when inserted in the optical disc, the optical disc driver is convenient to use and operate.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. An optical disc driver for loading or loading/writing an optical disc and accessing at least one memory card, the optical disc driver comprising:
    a housing; and
    a rectangular body comprising:
        a front panel disposed at a front side of the rectangular body;
        a main space, wherein an optical loading device configured to received the optical disk is disposed in the main space; and
        a spare space extending inwardly from the front panel and configured to receive the at least one memory card, wherein a plurality of electrical pins are disposed in the spare space;
    wherein the rectangular body is arranged to move relative to the housing between a first position in which the main space and the spare space are located within the housing and the front panel is adjacent to the housing, and a second position in which the front panel is moved apart from the housing, the main space is located outside of the housing so as to expose the optical loading device, and the spare space is also located outside of the housing.

2. The optical disc driver according to claim 1, wherein the front panel has an opening, and the opening penetrates through the spare space.

3. The optical disc driver according to claim 2, wherein the opening is disposed at one of the two sides of the front panel.

4. The optical disc driver according to claim 2, wherein the shape of the opening corresponds to the shape of the at least one memory card.

5. The optical disc driver according to claim 1, wherein the rectangular body comprises a circuit, and the circuit is connected to the optical loading device or the electrical pins.

6. The optical disc driver according to claim 5, wherein the spare space is a residual space where the main space and the space of the circuit are subtracted from space of the rectangular body.

7. The optical disc driver according to claim 1, wherein the main space is an optical disk slot.

8. The optical disc driver according to claim 7, wherein the spare space is at least one memory card slot.

9. The optical disc driver according to claim 8, wherein the optical disk slot and the memory card slot are formed from a same plane.

10. The optical disc driver according to claim 1, wherein the electrical pins are used for connecting to the at least one memory card.

* * * * *